INVENTORS
ALBIN BYSTROM JR.
RAYMOND E. METTER
DONALD B. SPENCER
BY Reynolds & Christensen
ATTORNEYS

3,541,551
INTRUSION DETECTOR RADAR WITH SPACE LINK CONTROL OF SURVEILLANCE AREA LIMITS

Albin Bystrom, Jr., Seattle, Raymond E. Metter, Bellevue, and Donald B. Spencer, Federal Way, Wash., assignors to The Boeing Company, Seattle, Wash., a corporation of Delaware
Filed Oct. 2, 1967, Ser. No. 675,273
Int. Cl. G01s 9/00; G08b 13/00
U.S. Cl. 343—5                                    5 Claims

ABSTRACT OF THE DISCLOSURE

The disclosure relates to an intrusion detector system for protecting a limited surveillance area by the use of radar-like techniques and apparatus. In the disclosed system a transmitter operable to emit intermittent wave energy pulses of predetermined duration is placed at one position adjacent to the surveillance area, and a cooperable receiver electrically isolated from the transmitter is positioned substantially on a common line of directivity with the transmitter and facing the transmitter from substantially the opposite side of the surveillance area. The receiver is subjected to wave energy pulses propagated over the direct space path along the common line of directivity between transmitter and receiver and over indirect space paths by reflection from objects located away from the direct space path. However, the receiver includes means rendering it operable only during and in response to reception of pulses transmitted directly from the transmitter and means for detecting changes in the combined energy received during the operative intervals by direct transmission and by reflection from objects within the surveillance area. Thus the actual surveillance area located on both sides of the direct space path between transmitter and receiver normally has a substantially elliptical periphery and is precisely limited by transmitter pulse duration and the spacing between transmitter and reeciver. An alarm or other utilization responsive to the detecting means in the system will not respond to the presence of objects outside the surveillance area, since for such objects coincidence does not occur in the receiver for energy traveling along direct and indirect space paths.

BACKGROUND OF THE INVENTION

This invention relates to intrusion detection systems and more particularly is directed to the provision of a simplified and versatile system having a limited and reliably defined surveillance area within which the presence of intruders will be detected without susceptibility to nuisance alarms caused by objects outside such area. The invention is herein illustratively described by reference to the presently preferred embodiments thereof; however, it will be recognized that certain modifications and changes therein with respect to details may be made without departing from the essential features involved.

In the primary application of this invention it is desirable to provide a reliable means for detecting the presence of an intruder in a predetermined security area without regard to the point of entry of the intruder into the area or his direction or speed of movement therein, and without influence from the presence or movement of objects outside such area. In that regard an important object of the present invention is to achieve positive and reliable control of the surveillance area coverage without critical placement of transmitter and receiver units and without necessity for electrical connections between transmitter and receiver stations, or other complexities of previous systems. Specifically it is an object hereof to establish the surveillance area limits by a simple and inexpensive means operating in response to wave energy propagating from the transmitter over the space path to the receiver.

Still another object is to provide a versatile, flexible and highly portable system adaptable to any of various terrain or site requirements including open areas, enclosed areas or combinations of both.

A further object hereof is to devise a detector system in which the outer limits of the surveillance zone may be changed readily by design or by adjustment in the field. A related object is to provide this type of flexibility without necessity for repositioning the transmitter and/or receiver and without criticality in the relative placement of the transmitter and receiver.

SUMMARY OF THE INVENTION

In accordance with this invention as herein disclosed the improved intrusion detector system in its preferred embodiment comprises a transmitter emitting periodic wave energy pulses simply the duration of which determines the outer limits of the surveillance area. A cooperable receiver is spaced from the transmitter for receiving the wave energy propagating over various space paths through the region therebetween including indirect space paths by way of reflection from intruder objects. The receiver includes means for limiting the responsiveness of the system to energy received in the receiver only during reception of the direct transmitted pulse or during a receiver-controlled period triggered by the directly transmitted pulse. In the preferred embodiment the receiver includes a superheterodyne-type circuit employing the directly received transmitted wave energy as a local oscillation or reference signal and beating the reflected energy signals against this reference signal in a mixer stage to produce difference frequency components variable in amplitude with size and reflectivity of objects in the surveillance area and varying from zero frequency to finite values determined by the Doppler shift caused by movement of reflecting objects. The resultant output is monitored for changes in value caused by an intruder so as to operate an alarm or other device. Because the mixer produces detectable output only during coincidence between received transmitted pulse energy arriving over the direct space path and any subsequently initiated reflection signals, reflections from objects beyond a certain locus of points measured by the sum of the respective distances from the transmitter to the object and from the receiver to the object, arrive at the receiver after cessation of the "local oscillator" signal and therefore go undetected. On the other hand, rapidly moving objects such as birds and the like which produce Doppler effect signals of a frequency beyond a predetermined cutoff point established in the receiver circuit go undetected. In these two ways nuisance-type alarms are avoided in the system.

In effect, therefore, the invention broadly utilizes a modulation characteristic (optimally pulse duration) imposed on the transmitted wave energy and received after space propogation as a means to determine and limit the surveillance area to be monitored by the system.

These and other features, objects and advantages of the invention will become more fully evident hereinafter by reference to the accompanying drawings.

DESCRIPTION OF THE PREFERRED EMBODIMENTS

Figure 1:
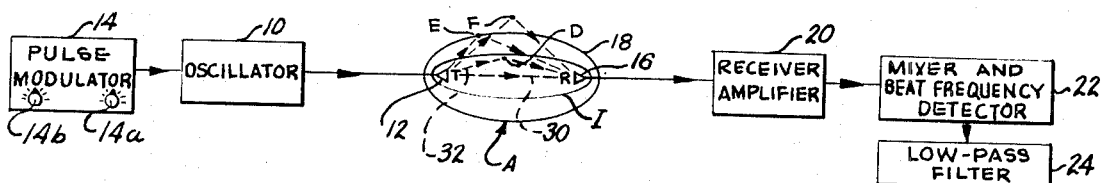
FIG. 1 is a block diagram of the invention in its presently preferred form.

Referring to FIG. 1, the wave energy transmitter comprises the oscillator 10 connected for energizing the transmitting antenna 12, and a pulse modulator 14 periodically operative to pulse the oscillator on at established intervals. A pulse length control 14a may be provided in the pulse modulator to permit adjusting the length of the modulation pulses, that is the duration of the "on" periods of the transmitter oscillator. If desired a pulse frequency control may also be incorporated in the pulse modulator as shown at 14b. However, it is desirable for obvious reasons to avoid increasing the frequency to the point where strong echoes are returning to the receiver by reflection from outlying objects in one pulse period as a result of transmission in a preceding pulse period.

The transmitter antenna 12 has such a radiation pattern and is placed at such a command position in relation to a surveillnce area A that its radiated energy is capable of propagating substantially uniformly into and through that area. The receiving antenna 16 is likewise placed in a corresponding but opposing command position at an opposite location in or adjacent to the area A. As will be shown, the surveillance area actually covered by the system as a result of the coincidence or gating action in the receiver is normally smaller or more restricted than the area which the antenna are capable of covering with a reasonable degree of uniformity on the basis of antenna gain or pattern characteristic alone. Further it will be evident that the defined area of coverage, A, is circumscribed by an elliptical line 18 with the transmitter antenna T and the receiver antenna R located at the foci of the ellipse and with the size of the ellipse (i.e. its major and minor axial dimensions) being determined by the antenna spacing and transmitted pulse length or equivalent.

Receiver antenna 16 feeds the receiver amplifier 20 which is capable of accepting all frequency components of interest including the frequency of the transmitted energy pulses and also the frequencies of transmitted energy pulse reflections occurring from moving objects and thereby differing by the Doppler shift from the transmitter frequency proper. These signals combine in the receiver amplifier circuit and pass to a mixer 22 including a beat frequency detector. The circuit 22 is equivalent to the mixer of a superheterodyne receiver in that it is capable of accepting the equivalent of a local oscillator signal and the variable input signal and producing an output which has components occurring at the sum and difference frequencies. In this case the difference frequencies, which vary from zero to some upper figure depending upon the relative maximum velocities of moving objects in the surveillance region, pass to a beat frequency detector. A low-pass filter network 24 eliminates frequencies occurring above an upper cutoff frequency such as those signal components which may be caused by birds and other small rapidly moving objects. The output of the circuit 22 then passes to a signal level change detector 26 which in effect constitutes a logic circuit capable of sensing any change in the continuously averaged amplitude of the output of the filter network 24. If the envelope of the combined signals varies by reason of an object moving into the surveillance region there will be a change in the output of the detector 26 which may be used to operate the alarm 28 or other utilization device.

Figure 2:
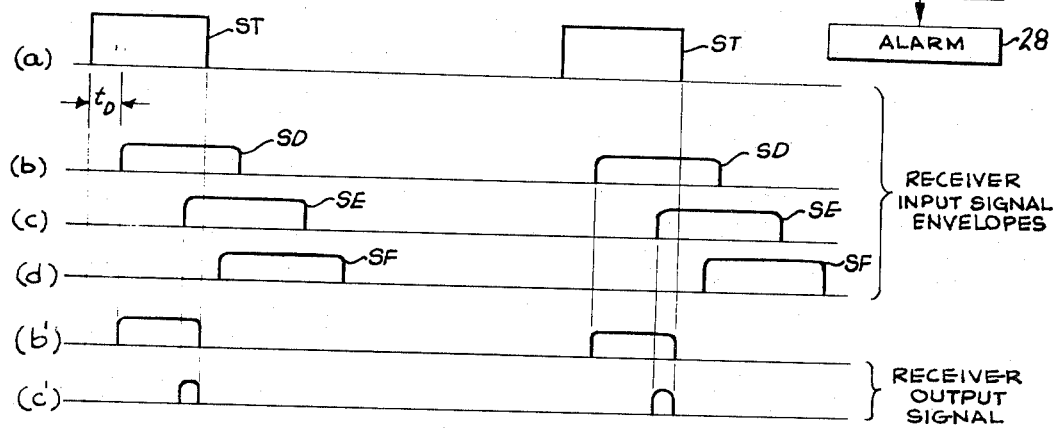
FIG. 2 is a wave diagram generally explaining the operation of the system in FIG. 1.

In FIG. 2 the directly transmitted pulse envelope ST appearing in the receiver is illustrated in wave diagram (a) and the idealized reflected signal envelope SD from the object D is shown in diagram (b), delayed by a time period $t_d$, corresponding to the difference in distances between transmitter T and receiver R by the direct path 30 and by the indirect path 32 which includes the reflecting object D. Wave diagram (c) represents the idealized reflected signal envelope SE of energy reflected from the more remote object at point E, whereas in diagram (d) the signal envelope SF represents reflections from objects at location F. It will be noted that both the signal envelopes SE and SD overlap, or are in partial time coincidence with the signal ST, whereas this is not true of the signal envelope SF. Wave diagram (b') shows the output wave resulting from the coincidence of signals ST and SD, whereas diagram (c') depicts that from coincidence between signals ST and SD. Because received signal SF occurs after termination of signal ST it does not appear in the receiver output. These wave diagrams thereby serve to illustrate the principle that the secure or surveillance area monitored is circumscribed by a definite locus of points determined precisely by transmitter pulse length. If desired, by use of appropriate antenna gain characteristics, pulse amplitude and receiver sensitivity or threshold levels the system may be made substantially selective in its response to intruders only in an inner ellipse or other inner area I while relying upon the coincidence circuit operation of this invention as a fail-safe or back-up feature defining a positive outer area limit line 18 beyond which no person or object will be detected as an intruder.

Figure 3:
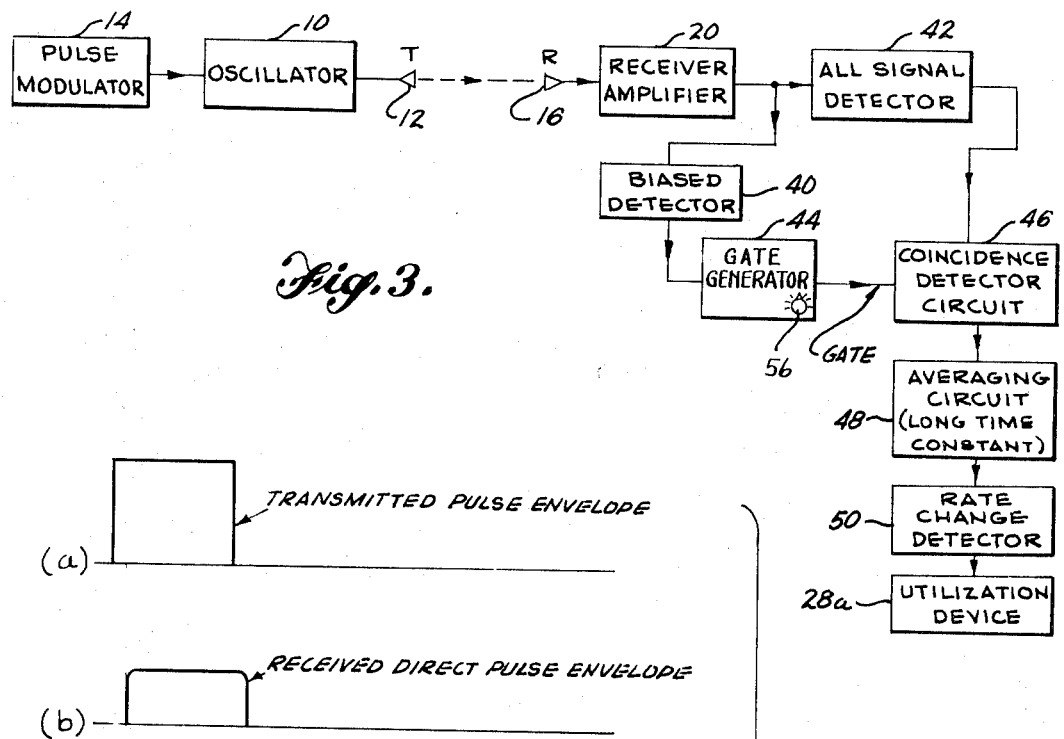
FIG. 3 is a block diagram of a modified system.

In FIG. 3 the principle of gating or time coincidence is illustrated in a modified system wherein parts bearing reference numerals similar to those shown in FIG. 1 correspond to the latter. In this case, however, the output of receiver amplifier 20 is divided into a biased detector 40 and a signal detector 42. The output of the signal detector 42 represents the combination of signals by the direct transmission path and by indirect paths including reflections from objects in the surveillance region. Biased detector 40 has a minimum threshold level established by the value of bias applied in a well known manner so as to pass only signals above a predetermined amplitude, so adjusted that only the transmitted pulse output and reflection signals superimposed thereon (i.e. in time coincidence therewith) possess a sufficient amplitude to pass through the bias detector 40 and produce an output pulse envelope applied to the clipper or gating circuit 44. This gating circuit 44 clips the top from the output of the bias detector 40 and thereby converts such output into a square wave or gating pulse of an amplitude established by the bias level of the detector 40 and by the cutoff or clipping level of the clipper circuit 44 adjustable by a cutoff control 56. This gating pulse corresponds to the duration of the transmitted pulse (established by a modulator 14) and is applied to the second input of the coincidence circuit 46. In effect the gating circuit 44 turns on the coincidence detector circuit 46 or sensitizes it to signals produced by the detector 42. The output of the coincidence circuit therefore represents the envelop of direct and reflected signals occurring in the receiver during occurrence of the directly transmitted pulse in the receiver. This is applied to an averaging circuit 48 which converts such pulses into a direct voltage or current and which has a sufficiently long time constant (equal to several transmitter pulse cycles) that a steady voltage is produced in the output of this circuit for application to the rate change detector 50. The latter represents a logic circuit of any suitable or known design which is capable of responding to changes in the output voltage of the averaging cricuit 48 occurring at a rate of change representative of entry of an object into the surveillance area of the system. In effect the rate change detector 50 may comprise a conventional differentiating circuit having a time constant so chosen that normal drift in output voltage of the detector 48 will not operate the utilization device 28a, whereas more rapid changes will do so. The output of detector 50 is applied to a utilization device 28a.

Figure 4:
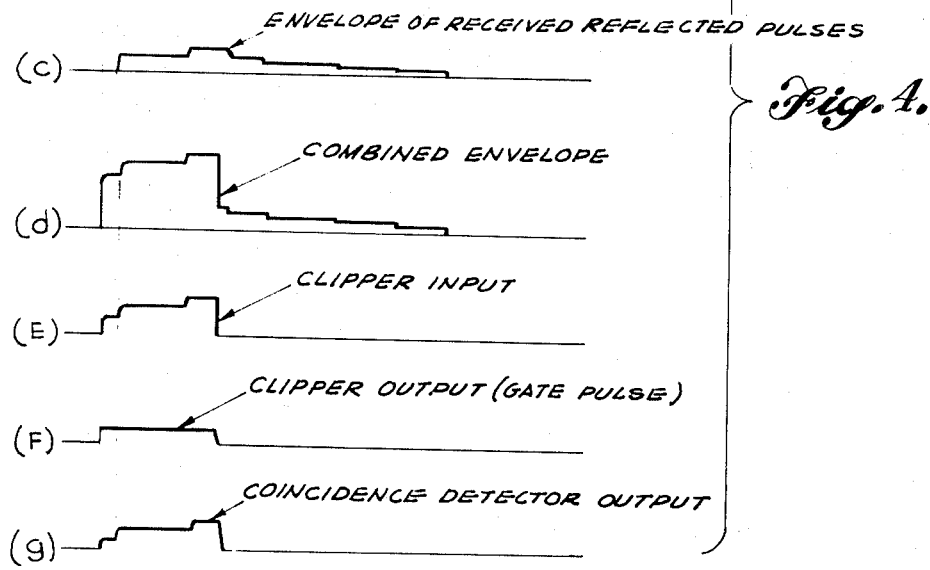
FIG. 4 is a wave diagram explaining the operation of the system in FIG. 3.

In FIG. 4 the wave diagram sequence (a) through (g) is appropriately labeled to illustrate the action of the system in achieving output in the coincidence detector circuit 46 representing the combined direct path and indirect path signals occurring only during the period of the received direct pulse from the transmitter.

Figure 5:
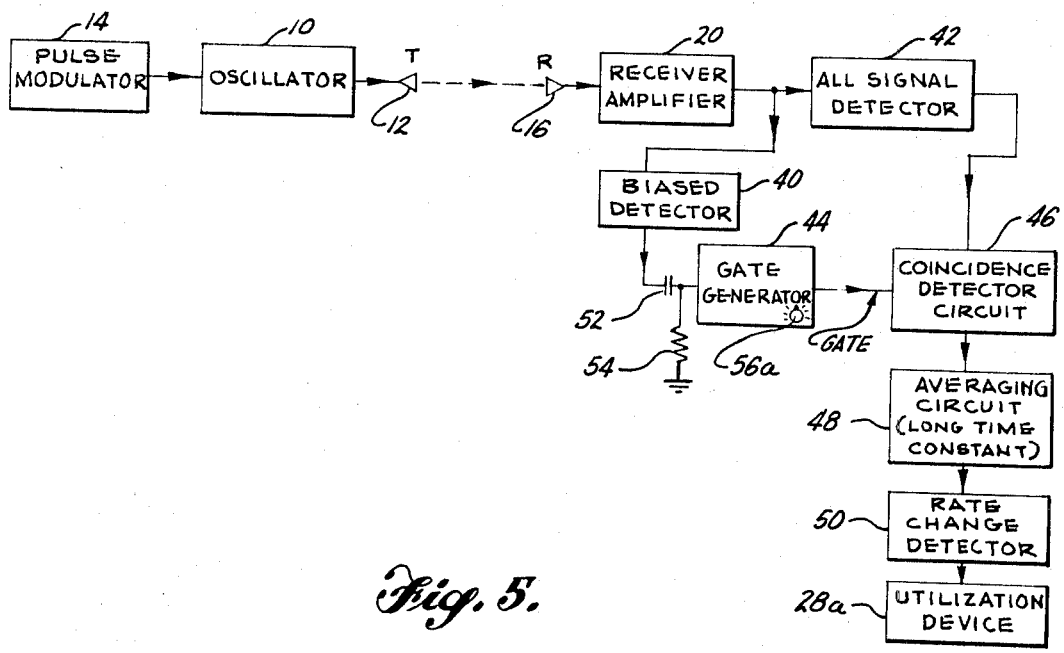
FIG. 5 is a block diagram of still another modification.

In FIG. 5 the modified system is generally similar to that shown in FIG. 3 with the exception of the manner of deriving the gating pulse for determining the outer limits of the surveillance area. In this instance the output of biased detector 40 is applied to a gate generator 44 through a differentiateing circuit comprising condenser 52 and resistance 54. The differentiating circuit 52, 54 converts the leading edge of the output of detector 40 into a sharp trigger pulse which initiates the gate pulse generated by generator 44. A pulse length control 56a of any suitable or usable form in the generator permits adjusting the length of the gate generator output pulse to any selected value which may include the length of the transmitted pulse or greater or lesses values, thereby to vary the limit or extent of the security area being monitored by the system.

Because of the simplicity of the coincidence or gating technique at the heart of this invention, utilizing the space path transmitter pulse energy itself in defining the surveillance area limits, the detection elements, i.e. transmitter and receiver, may be arranged as needed to cover any size area as well as perimeters of any desired length. Moreover they may be moved about from place to place at will without problems of stringing wires or laying cables between them each time and without need to perform any critical calibrations or synchronization operations affecting their operation relationships.

These and other aspects of the invention will be obvious to those skilled in the art on the basis of the foregoing disclosure of the presently preferred practice thereof.

We claim as our invention:

1. An intrusion detector system for protecting a limited surveillance area comprising a transmitter operable to emit intermittent wave energy pulses of predetermined duration, a cooperable receiver electrically isolated from the transmitter and positioned substantially on a common line of directivity therewith, facing said transmitter from substantially the opposite side of said surveillance area, for receiving said pulses and also the reflection of said pulses occurring from an intruder sufficiently proximate to the system that such reflections are received during the time of reception of the directly transmitted pulses and means included in said receiver operable only during and in response to the reception of the directly transmitted pulses for detecting changes in the combined received energy occurring by direct transmission and by reflection from the intruder.

2. The intrusion detector system defined in claim 1, wherein the means included in the receiver comprises a circuit having a mixer which produces signal components at the difference frequencies between the directly received transmitter wave energy and the wave energy received by reflection from moving objects.

3. The intrusion detector defined in claim 2, wherein the means included in the receiver comprises a frequency selective circuit which substantially cuts off at an upper difference frequency preventing response of the system to objects moving faster than a predetermined speed.

4. An intrusion detector system for protecting a limited surveillance area comprising a transmitter operable to emit energy pulses of predetermined duration, a cooperable receiver electrically isolated from the transmitter and facing the same from a position spaced therefrom across a portion of said area for receiving the wave energy pulses propagating over the direct space path between transmitter and receiver and over indirect space paths by reflection from objects located on either side of the direct space path, said receiver including coincidence circuit means operatively conditioned by the received direct space path wave energy pulses in the receiver to respond solely to those indirect space path wave energy pulses which are received in time coincidence with such direct space path pulses, whereby the limits of said area are defined by the duration of said pulses and the spacing of transmitter and receiver.

5. An intrusion detector system for protecting a limited surveillance area comprising a transmitter operable to emit intermittent wave energy pulses, a cooperable receiver electrically isolated from the transmitter positioned in diametrically opposed relation thereto on substantially the opposite side of said area for receiving the wave energy pulses propagating over the direct space path between transmitter and receiver and over indirect space paths by reflection from objects, said receiver including means to combine the indirect and the direct space path pulses to produce an output therefrom, and circuit means responsive to the direct space path wave energy pulses to limit the time period during which said combined pulses occur in said output and thereby to limit the extent of the area in which reflecting objects are detected.

References Cited

UNITED STATES PATENTS

| 2,502,464 | 4/1950 | Lehmann | 343—8 |
| 3,014,215 | 12/1961 | MacDonald | 343—7 |
| 3,193,823 | 7/1965 | Laakmann | 343—7 |

FOREIGN PATENTS 954,536  4/1964  Great Britain.

RICHARD A. FARLEY, Primary Examiner

U.S. Cl. X.R.

343—7; 340—258